Feb. 18, 1941.　　　E. K BENEDEK　　　2,232,428
HYDRAULIC POWER CIRCUIT AND CONTROL MEANS

Filed March 3, 1937

Inventor

ELEK K. BENEDEK

By John H. Leonard his Attorney

Patented Feb. 18, 1941

2,232,428

UNITED STATES PATENT OFFICE 2,232,428

HYDRAULIC POWER CIRCUIT AND CONTROL MEANS

Elek K. Benedek, Bucyrus, Ohio

Application March 3, 1937, Serial No. 128,829

4 Claims. (Cl. 60—53)

This invention relates to hydraulic pressure power circuits and means and methods for operating the same.

One of the principal objects of the present invention is to provide a hydraulic circuit for operatively connecting a rotary, radial piston, variable delivery, reversible pump and a rotary, radial plunger, variable speed, reversible, hydraulic motor to provide a hydraulic transmission mechanism.

Another object is to provide a hydraulic circuit in which novel cooperative relations between the pump and motor are provided and afford many advantages in the utilization of the transmission for locomotive vehicles and the like, and to enlarge the useful stroke of the motor.

For purposes of illustration, the circuit will be described in connection with a pump and motor operatively connected to provide a transmission mechanism for an automobile, the specific advantages and operating characteristics of the circuit being best illustrated by this concrete example. It is to be understood, however, that this embodiment is merely exemplary and the circuit is not to be limited to the particular use illustratively described.

The present circuit is an entirely closed circuit as distinguished from the customary by-pass circuits, and the advantages thereof will become more apparent from the following specification wherein reference is made to the accompanying drawing, in which.

Figure 3:
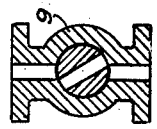
Figs. 2 and 3 are diagrammatic sectional views, respectively, of a control valve suitable for use in the circuit and illustrating certain operative settings thereof.
Figure 2:
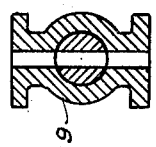

In order that the novelty and advantages of the present circuit may be understood more readily, a brief description of circuits of certain of my copending applications will be given.

In my co-pending application Serial No. 5,429, filed February 7, 1935, there is illustrated a closed hydraulic circuit connecting a variable delivery, one-way pump and a reversible variable speed motor. Such circuit includes a pressure line directly connecting the pump and motor and having a safety pressure relief valve leading to a sump, and a low pressure or suction line directly connecting the pump and motor and having a branch leading from the sump and provided with an automatic inlet check valve affording only a one-way flow into the suction line from the sump. The flow through such a circuit is always in the same direction, and fluid is supplied from the sump only to replace slip fluid or fluid discharged by the automatic relief valve. Reversal of operation of the resultant transmission is obtained in this prior circuit by mechanically reversing the direction of rotation of the motor, the pump and motor being hydraulically interlocked at all times and the relief valve operating only during excess pressure occasioned by shifting of the motor through its neutral stroke position. Such a circuit, when used in a transmission for a motor vehicle, for example, affords a positive but hydraulically elastic connection between the prime mover and the driven shaft, as a result of which the motor can be used as a brake by setting the pump at neutral.

In my co-pending application Serial No. 85,550, filed June 16, 1936, now Patent 2,098,214, issued November 9, 1937, there is illustrated a hydraulic motor designed primarily for rotary spindle machines, comprising a multi-stage, reversible, variable speed motor and a reversible, variable delivery pump.

In this circuit, the stages of the motor are connected in parallel with each other and connected to the pump. Leading from each of the fluid connections to the pump beyond the pump ports are extension fluid ducts which lead to a suitable sump, each extension having an automatic, one-way pressure relief valve for relieving extreme pressures and each having an automatic one-way inlet check valve between it and the sump. The relief valve in each instance is between the pump and the associated inlet valve. This circuit is reversible by mechanically reversing the pump or the motor and also by reversing the circuit. The automatic check valves, however, are each operable in only one direction and are not reversible themselves, and therefore many desired operating effects cannot be obtained. This particular prior circuit, using the multi-stage motor, is primarily for over-speed and under-speed drive with a constant horse power cycle. The relief valves, being operative at predetermined pressures, make the structure ineffective for constant torque cycle. Thus, in this prior circuit, the horse power remains constant during any motor stroke and speed adjustment, whereas in the circuit in the present application, assuming constant power, the minimum motor speed is the same as the pump speed.

In my co-pending application Serial No. 22,259, filed May 18, 1935, now Patent 2,163,079, issued June 20, 1939, a reversible, variable, delivery pump is connected to a reversible, variable speed, multi-stage motor in a non-reversible circuit, a set relief valve being provided in the pressure line of the circuit, and the suction line having no check valves or valves of any character, but being directly connected to the sump. This structure also provides a constant horse power cycle as distinguished from a constant torque cycle such as in the present application.

Figure 1:
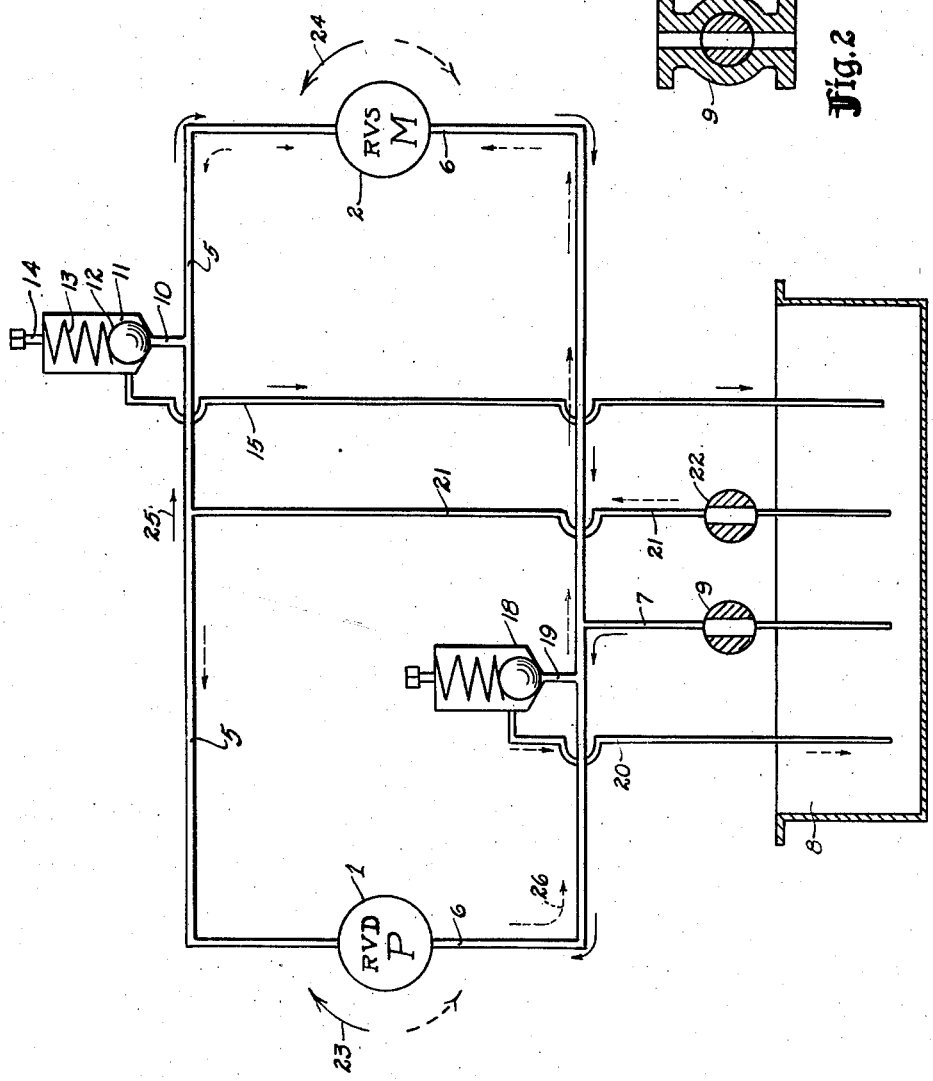
Fig. 1 is a diagrammatic illustration of the circuit with the control valves therein.

Referring next to the present circuit, the circuit is shown in Fig. 1 in connection with a pump 1 which is of the rotary radial piston type and is reversible and variable in its delivery, both the reversal and variation in delivery being effected by adjustment of the eccentricity of the reactance member. The motor 2 of the resultant transmission is of the rotary radial piston type and is of variable speed and reversible, both the variation in speed and reversal being effected by adjusting the reactance member. The pump and motor are preferably identical in construction except perhaps that the motor is larger in size than the pump and either may be used as a pump and either as a motor. The power and torque efficiencies of the pump and motor are sufficiently high to meet commercial requirements, and the weight, size and unit ratio of each is within or above commercially required limits. As exemplary of the particular pump or motor, the same may be such as disclosed in my copending application, Serial No. 27,558, filed June 20, 1935, now Patent 2,101,730, issued December 7, 1937, wherein the specific details of the same are disclosed and claimed. Such a reversible and efficient motor is necessary for rendering such a circuit operative and useful.

The pump discharges through a suitable conduit or pressure line 5 directly into the motor 2, the operating fluid being discharged from the motor through a return conduit or line 6 which leads to the inlet side of the pump, thus providing a closed hydraulic circuit. As more fully described in my Patent 2,163,079, the circuit thus far described is preferably located entirely within a valve pintle which is common to both pump and motor. Connected to the return line 6 is a conduit 7 which leads to a suitable sump 8, a cut-off valve 9 being provided in the conduit 7 between its connection with the return line 6 and the sump. To the pressure line 5 is connected a conduit 10 leading to an automatic pressure relief valve 11. The relief valve preferably comprises the usual bore in which operates a plug 12, the plug being seated by a spring 13 which is adjustable by a suitable screw 14. Connected to the valve 11 is a drain conduit 15 which returns the relief fluid to the sump 8. A similar valve 18 is connected by a conduit 19 to the return line 6, a drain conduit 20 leading from the valve 18 to the sump 8. Correspondingly, between the pump and motor in the pressure line 5, a conduit 21 is connected to the pressure line 5 and leads to the sump 8, a cut-off valve 22 being provided in the conduit 21 between the sump 8 and the line 5.

Assuming the pump to be operating so that the line 5 is the instantaneous pressure line and the line 6 is the return line, the pressure fluid is delivered from the pump through the line 5 to the motor and operates the same and then returns to the pump through the line 6. Under such conditions the valve 9 is open and the valve 22 is closed so that, while the circuit is a closed circuit, fluid is admitted from the sump through the conduit 7 for replacement of slip and relief fluid. If, for any reason, the pressure in the line 5 becomes excessive, it is relieved through the valve 11 and returns through the conduit 15 to the sump. Thus, assuming the pump is driven in the direction indicated by the solid arrow 23 and the motor is driven in the direction indicated by the solid arrow 24, the circuit will operate as a safe and efficient closed circuit, the flow of fluid being indicated by the solid line arrows 25. With the same condition existing, the motor can be mechanically reversed by reversing its reactance setting, any excess pressure occasioned during the extreme short stroke or zero stroke of the motor being relieved through the valve 11 and any loss of fluid through the valve 11 or by slip being replaced through the conduit 7. Thus the motor may be operated in either direction for a given direction of operation by the pump.

On the other hand, if the eccentricity of the pump is reversed so that its delivery is reversed, the line 6 becomes the instantaneous pressure line and the line 5 becomes the instantaneous return line. Concurrently with such reversal, however, the valve 9 should be closed and the valve 22 opened so that slip fluid can be supplied through the conduit 21 and excess pressure relieved through the valve 18 and conduit 20. This reversal of the delivery of the pump causes the flow through the circuit as indicated by the dotted arrows 26. Under this reversed flow, the direction of rotation of the motor can be reversed mechanically.

As more fully explained in my co-pending application Serial No. 716,451, filed March 20, 1934, now Patent No. 2,166,717, issued July 18 1939, both the pump and the motor are provided with stroke adjusting means and two-directional adjustment. Each of the valves 9 and 22 is two-directional and may be manually operated independently or may be automatic. They are assumed to be manually operated in the illustrative example.

Both the pump and the motor are reversible hydraulically as well as mechanically. In order to appreciate the advantages of the circuit, having in mind that it is a closed circuit as distinguished from the less efficient by-pass circuit, the following operation should be noted.

If both of the valves 9 and 22 are open at the same time, as illustrated in Fig. 1, it is apparent that there is no appreciable pressure in the circuit, but the circuit is at all times maintained filled with fluid by the pump. Accordingly, if the motor is drivingly connected to the wheels of the vehicle, complete free-wheeling is obtained regardless of the operation of the pump. Assuming the vehicle is coasting, the motor temporarily becomes a pump, pumping into an open circuit regardless of its direction of operation. If, at the same time, the motor is concurrently set at zero stroke, even the slight resistance to flow occasioned by the open circuit is eliminated. During such operation, the pump of course will run idle with its prime mover and maintain the other portion of the circuit filled with fluid.

Assuming next that the line 5 is the instantaneous pressure line and the valve 22 is closed and valve 9 is open, the circuit is reversible simply by closing the valve 9, opening the valve 22, and reversing the pump stroke. The converse is true if the line 6 happens to be operating as the instantaneous pressure line, as during such operations, the line associated with the open one of the valves becomes the return line through which the fluid is returned to the pump and slip is replaced.

If, during such operation, the then open valve is also closed without opening the already closed valve, both the pump and motor become interlocked hydraulically and a power braking effect is obtained, limited only by the relief valves.

With the one of the valves 9 and 22 in the instantaneous return line open and the other closed, the operation may still be controlled by adjusting the stroke of the pump or motor. If either the pump or motor is set to neutral while both valves 9 and 22 are closed, the main circuit is blocked and thus locks the other of the pump or motor.

When both of the valves 9 and 22 are closed, as described above, braking can be effected by reversing either the pump or the motor. For example, by reversing the pump, the driven momentum of the motor and rear axle of the car is subjected to braking action. If the motor only is reversed, the engine which drives the pump is subjected to the braking force. Thus the pump can be made to brake the motor and the motor to brake the pump and connected engine.

Assuming, for example, that the present invention is utilized in an automotive vehicle. If the vehicle is operating down grade and the momentum of the car overtakes the driving effect of the hydraulic motor M, the pressure in line 5 will gradually become zero, the motor speed eventually increasing beyond the driving speed of the prime mover and the operating speed of the pump. This would result in coasting or freewheeling with the motor running faster than the pump if the motor could take in additional fluid through the valve 22. But if the valve 22 is closed, and also the valve 9, the motor, having greater speed than the pump, will raise pressure in line 6 against the more slowly running pump. The pressure raised in line 6 is proportional to the momentum of the car. Thus the motor is driven, not by the pressure power of the pump, but by the momentum of the car. The resultant power developed by the motor, which now acts as a pump, is delivered to the pump, causing the pump to act as a motor against the prime mover and exert a braking power against the forward drive rotation of the prime mover. In this way the excess power of momentum to the car is transformed into dynamic braking power. During this cycle, both the pump and the motor have reversed themselves automatically in operation, but not by stroke reversal. Consequently, none of the relief valves, such as 11 or 18, will discharge, but there will be a reversal of pressure from line 5 to line 6. Thus there is a differential pressure between lines 5 and 6 during this special cycle and it is useful for braking the driving engine or prime mover.

Thus, if both valves 9 and 22 are closed, the circuit is closed entirely as long as the pressure remains below the working pressure of the relief valves. If, in this condition of the circuit, the pump is set to zero stroke the motor becomes hydraulically locked. It might be mentioned that this is of greater importance in connection with a gun turret on battle ships than in connection with automobiles, but it is important in either instance.

If, in this condition of the circuit, reversal of the motor is required at full pressure it can be effected by shifting the motor reactance member, the respective pressure relief valves opening in case of temporary excessive pressure. This reversal of the motor can be accomplished in a fraction of a second because the pump is continuously delivering fluid to the motor. If, on the other hand, the reversal is to be effected by reversing the pump, the motor receives no pressure during the slip movement of the pump near zero stroke and there is a gradual decrease of pressure for operating the motor in one direction until zero operation of the motor is established, and then the motor gradually builds up speed in the opposite direction. Thus, during pump reversal from one side of the rotative axis to the other, an idle pressureless period results, with the resultant loss of time and resultant back-lash in operating parts of the mechanism and the apparatus driven thereby. Such backlash should be avoided in all instances and in gun turrets it must be avoided. Consequently, a reversal of the motor directly is of extreme advantage. Of course there is a temporary pressure rise in the circuit when shifting the motor eccentricity, but this pressure is relieved through the valves, such as 11 or 18. In other words, it is of greater advantage, in many instances, to have a temporary pressure rise rather than a temporary pressure drop. Consequently, the pump, as well as the motor, operates itself as a reversible valve in that reversal of the one of the units which is then acting as a pump causes a reversal of flow in the circuit. The reversal of the motor, when it is operating as a motor, does not reverse the flow of the circuit but the effect of such reversal is the same as a reversing valve which causes an instantaneous reversal of flow in the internal fluid circuit of the motor. Thus, dynamic braking power is provided.

Assuming, again, that a vehicle is operating down grade, instead of closing both valves 9 and 22, valve 22 may be open and valve 9 closed, thus reversing the circuit and developing pressure in line 6 by the motor while taking fluid into line 5 through the valve 22. Since the stroke of the pump is variable, it may be operated at just enough capacity so as not to brake the engine but only to brake the momentum of the car. If under these circumstances, the pump and motor are working in opposition to each other, both draw fluid through the valve 22 and discharge it through the relief valve 18, and very effective braking is provided, due to the restricted size of the relief valve passage of the relief valve. By adjusting the pump under these conditions, just the desired amount of braking power can be obtained.

Next, if the valve 9 is open and the valve 22 is closed, with the pump delivering pressure to the motor through line 5, as soon as the momentum of the car dominates the driving power and the motor thus reverses itself and acts as a pump, the valve 9 may be closed and the valve 22 opened and the stroke of the pump reduced below the motor in such a manner that the motor will receive part of the fluid from the pump and part through the valve 22, thus changing and controlling the dynamic braking power. With the valve 9 thus closed, only the difference between the discharge of the motor and the intake of the pump must be discharged through the relief valve 18. Thus the relief valve does not have to pass all of the fluid pumped by the motor but only the differential between the capacity of the motor and the capacity of the pump. This amount is the same as the differential amount which is sucked through the open valve 22. Consequently, the valve 18 may act as a fluid friction brake and eliminate the necessity of subjecting the mechanical brakes to excessive wear.

Thus it will be seen that by the use of a completely closed circuit connecting a reversible, variable delivery pump and a reversible, variable speed motor of corresponding operating characteristics, each of which is reversible hydraulically and mechanically, a large number of operating effects can be obtained which render the structure adaptable for many different machines, such, for example, as automobiles and machine tools.

Among the advantages obtained from the present circuit are the following:

1. The circuit may be used as a positive power brake for decelerating or stopping the vehicle.
2. Free wheeling of the vehicle is possible.
3. The direction of rotation of the motor can be reversed in two distinct ways: first, by shifting the reactance member of the motor to the opposite side of dead center and thus reversing the direction of the motor without changing the direction of flow of liquid to it, and second, by shifting the reactance member of the pump to the opposite side of the zero delivery position and thus reversing the motor by reversing the direction of the flow of liquid in the circuit.
4. The circuit may be used for postively braking the engine itself. The braking of the engine is done so that the momentum of the car will be used to pump enough fluid to the pump to brake the pump and engine or to make the engine slow down. Thus the stroke of the hydraulic motor will be established by adjustment to gradually slow down and brake the engine with its connected pump.
5. The cycle provided when the motor becomes a pump due to the forward movement of the vehicle and pumps against the force of the pump is one of the main advantages of the double reversal. In such an instance, the motor will become a pump and the pump, under such circumstances, will be opposed by the fluid pressure developed by the motor sufficiently to slow or brake entirely the prime mover.

Further, it is apparent from the foregoing description that the valves 9 and 22 may be mechanically connected to various operating levers of the associated vehicle so as to be operated directly thereby, or may be operated by different control circuits related as desired to the operating characteristics of the particular vehicle.

When a pump and motor are included in a combination in a hydraulic circuit and both are of the same capacity, so long as the pump is kept at full stroke and full pressure, it will develop maximum horse power and will operate at a constant maximum. If the fluid thus delivered is passed to a motor of the same capacity, the motor will deliver a constant maximum horse power irrespective of the stroke of the motor. At its full stroke, the motor would have the same speed as the pump and at shorter stroke it would run faster but the horse power cycle would remain the same. If, however, the output volume of the pump is decreased but the pressure is kept at maximum, the motor will operate at slower speeds, its speed decreasing as the pump delivery decreases, but if the motor is kept at full stroke and the pressure is maintained constant for the given pump setting, the maximum power will be translated into maximum torque. Therefore, at constant operating pressure, change of pump stroke controls the power delivery while a change of motor stroke controls the torque. Attempts to control torque by pump adjustment result in very inefficient operation.

It is seen therefore that momentum of the car reverses both the pump and motor and if only one were reversible the transmission could not meet the conditions herein set forth. Under many conditions, it is only necessary that either the pump or the motor be reversed, but there are many conditions under which reversal of both simultaneously or independently is required and reversal of operation of the combination by reversing the pump is entirely different in the operating characteristics produced than is the reversal of operation effected by reversal of the motor. Pump reversal necessitates a dead period, as heretofore pointed out. Motor reversal does not. Additional utility resulting from the provision of both a reversible pump and a reversible motor is likewise shown in connection with an automotive vehicle. For instance, it makes possible the elimination of a clutch because at starting and stopping, the pump can be set to zero. If, for some reason, the car is stopped when the pump is at zero and cannot be started, the car remains locked because any attempt to move it would cause the motor to operate as a pump and thus pump fluid in a blocked circuit. If, however, the motor can be set to zero, the car may be pushed or towed without subjecting any of the operating mechanism to any strain. It provides, in operating effect, the same results as are provided by releasing the clutch.

In many instances, the motor is closer at hand for the operator than is the pump. Therefore, the motor, which is more nearly within reach of the operator, is much easier to adjust. Here, again, as in the case of a gun turret, the pump is on the floor while the hydraulic motor is close to the operator and must be so for djusting and depressing the gun. It is much more desirable to have the adjustment for this feature readily accessible to the operator. Again, since the pump replaces the clutch in a motor vehicle, it must be capable of unloading. It is desirable for safety to reverse the motor while the pump is set to neutral so that during reversal of drive, the engine is disconnected. If, as in conventional vehicles during the reversing shift, the engine is disconnected, there can be no mishap, even if the shift is wrong, until the engine is reclutched. But in a hydraulic circuit, shifting of the motor while the pump is set at neutral gives quite a different result than keeping the motor at predetermined stroke and reversing the pump. In the latter instance, if the pump reversal is wrong, the car reverses immediately as the pump is shifted into reverse. But when with the pump disconnected entirely and the motor is set to reverse, the pump may then be gradually applied in the "on" direction in the same manner as engaging the conventional clutch, and a gradual build-up of the speed is obtained. Mere reversal by the pump, however, requires simultaneous application of power and reversal of the car while with the present structure the drive may be reversed by presetting the motor and then the power gradually applied.

Having thus described my invention, what I claim is:

1. In a hydraulic transmission, a pair of main conduits, a reversible variable displacement rotary pump interconnecting said main conduits, a hydraulic motor connected between said main conduits, a sump, and manually operable means for selectively connecting either or both of said main conduits to the lower part of said sump.

2. In a hydraulic transmission, a pair of main conduits, a reversible variable displacement rotary pump interconnecting said main conduits, a hydraulic motor connected between said main conduits, a sump vented to the atmosphere, and manually operable means for selectively connecting either or both of said main conduits to the lower part of said sump.

3. In a hydraulic transmission, a pair of main conduits, a reversible variable displacement rotary pump interconnecting said main conduits, a reversible variable displacement hydraulic motor connected between said main conduits, a sump vented to the atmosphere, and manually operable means for selectively connecting either or both of said main conduits to the lower part of said sump.

4. In a hydraulic transmission, a pair of main conduits, a pump interconnecting said conduits, said pump being capable of having the displacement thereof continuously varied from a maximum in one direction through zero to a maximum in the other direction while being continuously driven in one direction, a reversible variable displacement hydraulic motor connected between said main conduits, a sump vented to the atmosphere, manually operable means for selectively connecting either or both of said main conduits to the lower part of said sump, and pressure relief valves connecting said main conduits to said sump.

ELEK K. BENEDEK.